H. CLEMENT.
ACCESSORY FOR OPHTHALMOMETERS.
APPLICATION FILED SEPT. 29, 1920.
1,421,173.
Patented June 27, 1922.
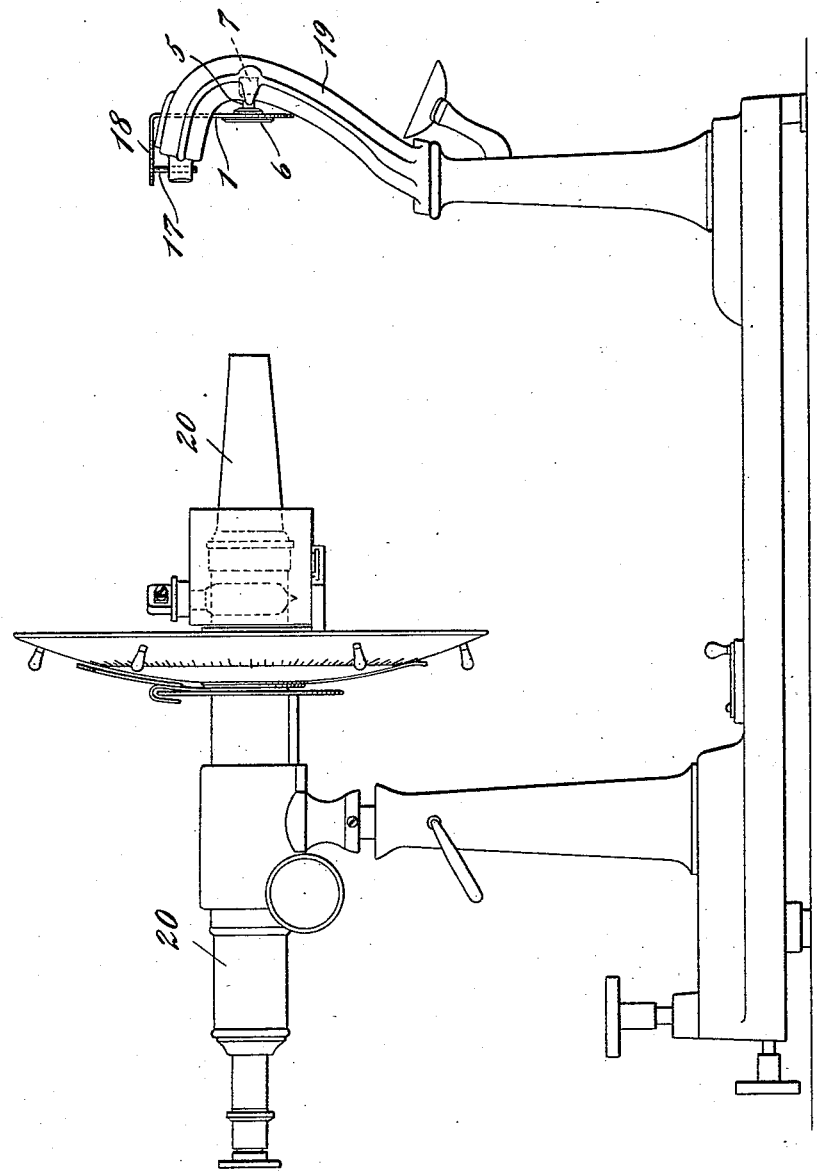
INVENTOR.
BY
ATTORNEY.

H. CLEMENT.
ACCESSORY FOR OPHTHALMOMETERS.
APPLICATION FILED SEPT. 29, 1920.
1,421,173.
Patented June 27, 1922.
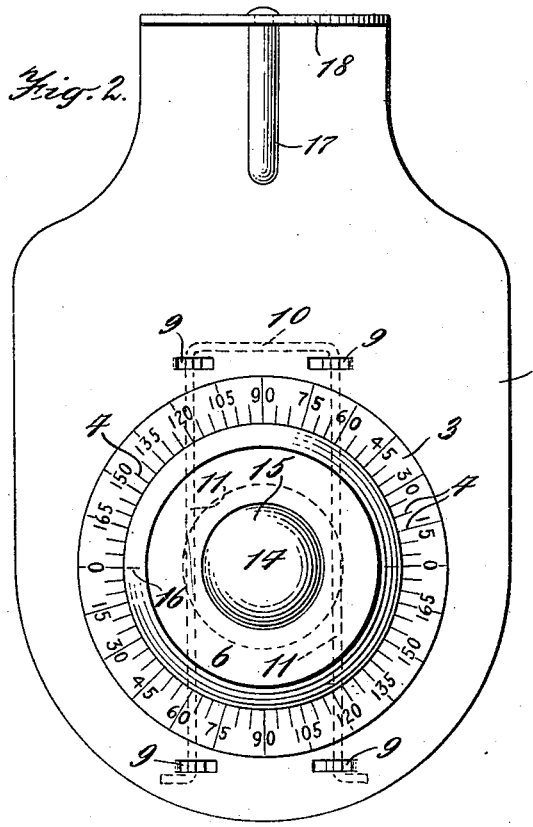
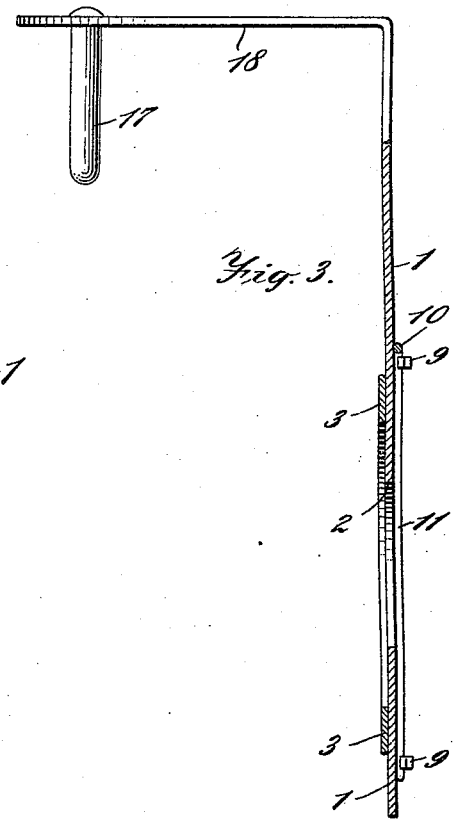
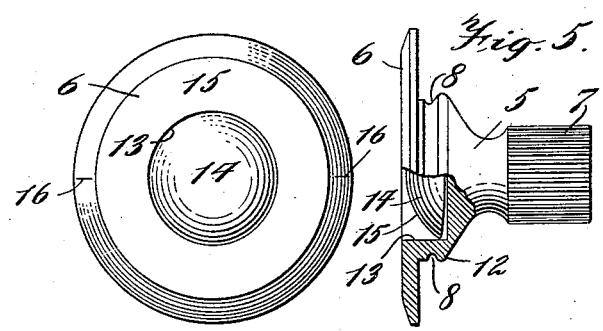
Hans Clement INVENTOR.
BY
Rosenbaum, Stockbridge & Borst ATTORNEYS.

UNITED STATES PATENT OFFICE.

HANS CLEMENT, OF NEW YORK, N. Y., ASSIGNOR TO GENERAL OPTICAL COMPANY, INC., A CORPORATION OF NEW YORK.

ACCESSORY FOR OPHTHALMOMETERS.

1,421,173.  Specification of Letters Patent.  Patented June 27, 1922.

Application filed September 29, 1920. Serial No. 413,485.

*To all whom it may concern:*

Be it known that I, HANS CLEMENT, a citizen of the United States, residing at the city of New York, in the county of Bronx and State of New York, have invented certain new and useful Improvements in Accessories for Ophthalmometers, of which the following is a full, clear, and exact description.

This invention relates to accessories or attachments for ophthalmometers and is in the nature of an educational device by means of which practical training in the use of an ophthalmometer can be given. Prior practical methods of training students in ophthalmometry comprised two plans, to wit:— (1) practice with the instrument and some person's eye, in which case the examination was not only annoying to the person whose eye was being examined but the accuracy of the operator's measurements could not be readily checked, and (2) insertion of a cylindrical test lens in front of an artificial spherical cornea which was being examined with the ophthalmometer, in which case the result was unreliable and inaccurate due to the fact that the light would undergo refraction while passing through the cylindrical lens, the lens being necessarily spaced from the cornea, and consequently the reading of the ophthalmometer would not represent the full amount of astigmatic error in the lens that was placed before the spherical cornea.

An object of my invention is to provide improved means for instructing students in the use of the ophthalmometer by which the accuracy of their readings in test exercises can be readily checked and a plurality of different conditions similar to those found in the human cornea presented for examinations.

A further object is to provide improved means for this purpose which can be utilized as an accessory for the usual opthalmometers, and which is simple and durable in construction and inexpensive to manufacture.

Other objects and advantages will be apparent from the following description and the novel features of my invention will be particularly pointed out in claims.

My invention comprehends the provision of an astigmatic artificial cornea having meridianal curves of known radii. It further comprehends the provision of a frame for attachment to or support in proper position with respect to an ophthalmometer, in which frame, artificial corneas, each representing some possible condition of astigmatism, can be interchangeably supported and their major axes made to coincide with any meridian in a complete revolution. It further comprehends the details of construction which will be more fully presented in connection with a description of the accompanying drawing, in which:

Fig. 1 is an elevation of an opthalmometer having my astigmatic cornea attachment carried thereby.

Fig. 2 is a front elevation of my attachment.

Fig. 3 is a vertical sectional elevation of the frame of the same,

Fig. 4 is an elevation of one of the interchangeable corneas with its mounting, and Fig. 5 is a side elevation of the same with a portion broken away to more clearly illustrate the details.

In the illustrated embodiment, I provide an L-shaped frame 1 of suitable sheet material, and the stem portion has an aperture 2 therein. Surrounding this aperture and concentric therewith I secure to that face of the stem portion from which the leg portion extends, a ring 3 which has a scale 4 thereon. This scale has graduations running from 0° to 180° in both the upper and lower semicircles. A button or mount 5 is rotatably disposed in the aperture 2 and has a disk-like portion 6 within the ring 3 and against the face of the frame. The ring thus forms a bearing for the rotatable button. The button has a shank or finger engaging portion 7 which projects from the disc portion 6 through the aperture 2 and is knurled at its end to facilitate its rotatable adjustment. The shank portion 7 adjacent its union with the disc portion 6 is provided with an annular groove 8. The frame, upon the rear face of its stem portion, has struck up lugs 9 which support a U-shaped spring wire 10, the arms 11 of which slightly cross the aperture 2 at diametrically opposite sides thereof and engage in the annular groove 8 of the mount. The spring arms, by their engagement in the groove 8, retain the button or mount in position in the aperture of the frame and at the same time permit of rotation of the button in the aperture. The friction of the spring arms in the groove also assists in holding the button in any position to which it is rotated. The button or mount is provided with a beveled annular surface 12 which leads to the groove 8 so that when the button or mount is inserted into the aperture of the frame the spring arms 11 will be engaged by the beveled surface 12 and cammed aside and then allowed to snap into the groove. The button is provided with a recess 13 disposed axially thereof and opening from the face of the disc portion 6. In this recess I secure in any suitable manner an artificial cornea 14 having a convex corneal surface 15 representing any selected condition of the human cornea, particularly an astigmatic condition. This cornea may be a plano-convex glass object, with its convex surface ground and polished like a toric cylinder with two curves at 90° to each other, but if desired the angle between the curves could be slightly varied in order to represent some of the rarer conditions of the human cornea. The radii of the curves in the principal meridians chosen are those of a value usually found in the human cornea. For example, two of the radii chosen for the two principal curves of one cornea may be 7.5 mm. and 8 mm. respectively. The exact curvatures chosen are not essential, so long as their radii are known, but it is best to select them somewhere within the range found in the human cornea. I prefer to provide a plurality of the buttons or mounts with corneal surfaces representing a variety of conditions found in various human corneas, and these buttons can then be interchangeably supported in the frame. By means of a reference mark 16 on the mount, the axis of the cornea 14 can be made to coincide with any meridian in a complete revolution by reference to the scale divisions 4 of the ring.

The frame 1 may be supported in proper position with respect to the ophthalmometer in any suitable manner, but for convenience I provide a pin 17 riveted to the short leg or arm 18 of the frame and extending in the direction of the stem of the L-shaped frame. This pin can be inserted into a small opening in the top of the head rest 19 of an ophthalmometer and the frame 1 supported therefrom with its button or mount 5 disposed co-axially with the telescope 20 of the ophthalmometer. The artificial cornea would thus occupy a position similar to that of a human eye during an examination.

The principle and construction of ophthalmometers is well known, two forms being shown and described, for example, in the patents to Buchhop No. 1,006,825, dated Oct. 24, 1911, and Meyrowitz No. 875,278, dated Dec. 31, 1907, to which reference may be had for a full disclosure. Briefly, however, the principle of the construction of the ophthalmometer is based upon the law of reflection by a convex mirror, the external surface of the cornea serving as the mirror. The telescope is directed toward the cornea or convex mirror and focused on a luminous object or objects reflected from the external surface of the cornea or from the artificial cornea. In other words, the angles at which the luminous objects are reflected from the surface of the cornea into the barrel of the telescope is measured. The luminous objects used are known as the mires and are generally arranged on an arcuate frame forming a rigid part of the telescope, the mires being separable to different positions on the arcuate frame. When the instrument is adjusted the luminous mires may be seen reflected from the surface of the cornea through the barrel of the telescope and the angles of reflection will depend on the curvature of the reflecting surface. The curvature may vary in different meridianal planes in conditions of astigmatism and the main use of the instrument is to determine the difference in the curvatures of the different planes usually at 90° to one another.

By the use of my invention, a student may practice with the instrument as much as desired or necessary without tiring anyone but himself, and since the curvatures of every artificial cornea used will be accurately known, he can check up his readings or conclusions and thus know whether or not he is operating his instrument correctly and accurately. By interchanging in the frame 1 the mounts or buttons 5 having convex surfaces representing various conditions of astigmatism, the student can operate his instrument under conditions varying like those he is likely to encounter in practice, and can check up his records from the known values of the curvatures so as to more quickly become proficient and accurate in his manipulation of the instrument and gain confidence in his ability to make proper examinations of an eye.

It will be obvious that various changes in the details herein described and illustrated may be made by those skilled in the art within the principle and scope of my invention.

I claim:

1. An accessory for ophthalmometers comprising a frame having means for attachment to an ophthalmometer and a device having a convex toric reflecting surface detachably carried by the accessory frame.

2. An accessory for ophthalmometers comprising a frame having means for attachment to an ophthalmometer and a device having a convex toric reflecting surface carried by the accessory frame.

3. An accessory for ophthalmometers comprising a frame having means for attachment to an ophthalmometer and also having an aperture therein, a device rotatably mounted in said aperture and having therein an artificial corneal surface, and means carried by the frame for releasably securing said device in position in said aperture.

4. An accessory for ophthalmometers comprising a frame having means for attachment to an ophthalmometer and also having an aperture therein, a device rotatably mounted in said aperture and having therein an artificial corneal surface, and means carried by the frame for yieldingly securing said device in position in said aperture.

5. An accessory for ophthalmometers comprising a frame having means for attachment to an ophthalmometer and also having an aperture therein, a device rotatably mounted in said aperture and having therein an artificial corneal surface, said device also having an annular groove thereon and a spring device yieldingly engaging in said groove for retaining said device in said aperture and for permitting rotation of the same while so retained.

6. An accessory for ophthalmometers comprising a frame having means for attachment to an ophthalmometer, an aperture therein, and a scale surrounding the aperture, a device rotatably mounted in said aperture and having an artificial corneal surface and a reference mark for use with said scale, and means for releasably securing said device in said aperture without limiting its rotary movements.

7. An accessory for ophthalmometers comprising a frame having means for attachment to an ophthalmometer and also having an aperture therein, a device rotatably mounted in said aperture, and having therein an artificial corneal surface, said device having an annular groove and a beveled surface leading thereto, struck out lugs on said frame, and a spring wire secured to the frame by the lugs and adapted to snap over the beveled surface into the groove when the device is inserted into the aperture and thereby retain the device in position and permit of its rotation.

8. An accessory for ophthalmometers comprising a frame having means for attachment to an ophthalmometer and also having an aperture therein, a device rotatably mounted in said aperture, and having therein an artificial corneal surface, said device having an annular groove therein, a pair of spring members secured to the frame on diametrically opposite sides of the aperture and engaging in said groove to retain the device in the frame and permit of its rotation therein.

9. An accessory for ophthalmometers comprising an L-shaped frame of sheet material, an attaching member extending from one arm of the frame in the same general direction as the other arm extends, by which the frame may be attached to the head support of an ophthalmometer, the other arm of the frame having therein an aperture, and an astigmatic cornea removably mounted for rotation in said aperture.

In witness whereof, I hereunto subscribe my signature.

HANS CLEMENT.